No. 712,905. Patented Nov. 4, 1902.
J. W. H. CANNON.
NUT LOCK.
(Application filed Mar. 3, 1902.)
(No Model.)

Inventor
J. W. H. Cannon

Witnesses

By
R. S. & A. B. Lacey
Attorneys

UNITED STATES PATENT OFFICE.

JAMES W. H. CANNON, OF ORANGEBURG, SOUTH CAROLINA.

NUT-LOCK.

SPECIFICATION forming part of Letters Patent No. 712,905, dated November 4, 1902.

Application filed March 3, 1902. Serial No. 96,478. (No model.)

*To all whom it may concern:*

Be it known that I, JAMES W. H. CANNON, a citizen of the United States, residing at Orangeburg, in the county of Orangeburg and State of South Carolina, have invented certain new and useful Improvements in Nut-Locks; and I do hereby declare the following to be a full, clear, and exact description of the invention, such as will enable others skilled in the art to which it appertains to make and use the same.

This invention has relation to improvements in nut-locks, and has for its object the production of simple, durable, and efficient means for holding a nut upon a bolt against casual retrograde rotation.

The main purpose of the invention is to provide a nut-lock in which the parts are so constructed as to permit of the nut being turned up when the parts become loosened by reason of wear without the necessity of detaching any of the operative parts.

The invention consists of certain features of construction and combination and arrangement of parts, as will be hereinafter more fully described, and particularly pointed out in the appended claims.

A practical embodiment of the invention is shown in the accompanying drawings, in which—

Figure 1:
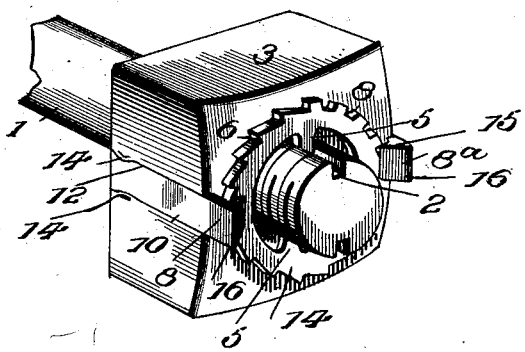
Figure 2:
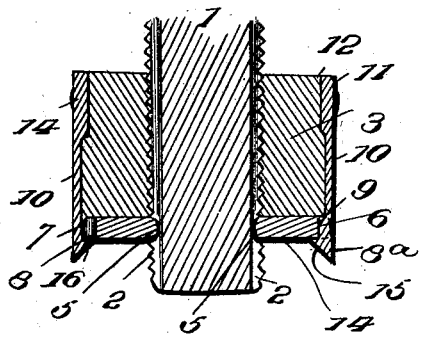
Figure 3:
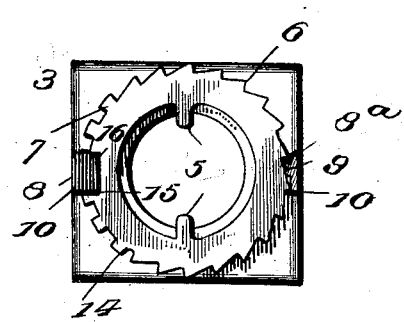
Figure 4:
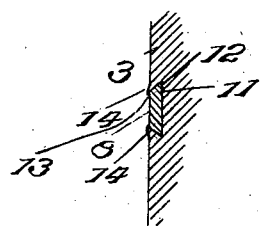
Figure 5:
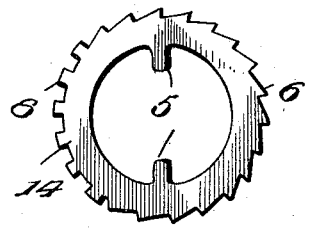

Figure 1 is a perspective view of a bolt and nut equipped with my invention. Fig. 2 is a vertical longitudinal section of the same. Fig. 3 is an end view looking toward the outer face of the nut. Fig. 4 is a detail section through the nut and the shank or stem of one of the pawls. Fig. 5 is a plan view of the ring or washer.

Referring now more particularly to the drawings, the numeral 1 represents a bolt the shank or stem of which is provided along its threaded portion with diametrically opposite longitudinal grooves 2, and 3 represents a nut which is adapted to turn upon the threaded portion of the bolt in the usual way.

In carrying my invention into practice I provide a ring or washer 14, which is adapted to be fitted upon the bolt in position to bear against the outer face of the nut and is provided with tongues 5 to project into the grooves 2 and hold said ring or washer against rotation. The ring or washer is applied and removed by sliding it longitudinally along the bolt, in which movement the tongues 5 traverse the grooves 2, and it is formed on its periphery with a series of ratchet-teeth 6 and a series of spur or stop teeth 7.

Coöperating with the teeth 6 and 7 are detents 8 8ª, located upon opposite sides of the nut 3, one of which has a pawl 9 to engage the teeth and each a spring-plate stem 10. This stem is enlarged and dovetailed at its rear or inner end, as shown at 11, to enter a dovetailed groove 12, formed in the side of the bolt, and is formed with seats or shoulders 13 to receive or to be engaged by projections 14, formed by displacing a portion of the metal of the bolt, whereby the stem is held from longitudinal movement in said dovetailed groove and is securely retained in position. The forward portion of the stem of the catch 8 has sufficient elasticity to normally hold the pawl 9 in engagement with the teeth on the toothed washer or ring and the stems of both catches have sufficient elasticity to permit of said catches being forced back in fitting the ring upon and detaching it from the bolt. The ring when fitted in position for operation is held from outward displacement by detents 15, formed upon the free ends of the stems 10, said detents being provided with straight or square shoulders to bear upon the outer face of the ring and prevent outward movement thereof, and beveled inner faces 16 to permit of the ring being slipped upon the bolt under pressure.

In applying the ring to the bolt the ring is first slipped on the outer end of the bolt, with the tongues 5 slatted in the grooves 2, and then said ring is forcibly pressed inward to bear against the beveled faces 16, whereby the free ends of the pawls are forced outward to allow the ring to move behind the detents 15 and then resume their normal position to bring said detents in front of the ring to hold the latter from slipping outward on the bolt when it is desired to disengage the ring, as is likely under some conditions. The free ends of the detent members are forced back, leaving the ring free to be slipped off. If desired, the catch or detent 8ª may be inflexible and integral with the nut, the catch having sufficient flexibility to permit of the ring being applied and removed.

In operation after the nut has been screwed home the toothed ring is placed in position for use and is held from rotation by the tongues 5 and from outward movement by the detents 8 8ª, while the pawl 9, engaging one of the teeth of the sets 6 or 7, holds the nut against retrograde rotation. It is well known that under the vibration produced by the passage of trains over the rails the parts are subjected to wear, which in time loosens the fastenings notwithstanding the fact that the nuts have been rigidly held from movement. When looseness thus occurs, a retightening of the parts by the further advance of the nuts on the bolts is required. To enable this to be quickly and conveniently done without the necessity of removing any of the parts, I so place the toothed ring on the bolt that the pawl 9 is free to traverse the inclined faces of the teeth, when the nut is screwed farther on the bolt, thus enabling the nut to be tightened up. When, however, the pawl reaches the teeth 7, the latter will prevent further movement of the nut in the direction of screwing it farther on the bolt, while the square face of the adjacent tooth 6 will hold the nut against retrograde rotation.

It will be noted from the construction of this lock that it is adapted for bolts having either right or left hand threads by simply inverting the washer, thus rendering it unnecessary to have a separate washer for different cuts of thread.

Having thus described the invention, what is claimed as new is—

1. In a nut-lock, the combination of a bolt, a nut thereon, a toothed washer held from rotation on the bolt, spring-actuated detents on the nut to prevent outward displacement of the washer, and a pawl carried by one of said detents to engage the teeth of the washer, substantially as described.

2. In a nut-lock, the combination of a bolt, a nut thereon provided with a dovetailed groove in its side, a washer held from rotation on the bolt, a spring-detent having a stem formed with a dovetailed portion fitted in said groove and holding the washer against outward displacement and engaging the same to hold the nut against retrograde rotation, and projections on the nut holding the detent seated in the groove, substantially as described.

In testimony whereof I affix my signature in presence of two witnesses.

JAMES W. H. CANNON. [L. S.]

Witnesses:
GLADYS L. THOMPSON,
GENEVIEVE MATTHEWS.